(12) United States Patent
McGinnis et al.

(10) Patent No.: US 12,709,650 B2
(45) Date of Patent: Aug. 18, 2026

(54) REACTOR VENT CONTROL TO AVOID VENT COLUMN BREAKTHROUGH

(71) Applicant: ExxonMobil Chemical Patents Inc., Baytown, TX (US)

(72) Inventors: Aaron C. McGinnis, Houston, TX (US); Michael G. Tribo, Humble, TX (US); Michael D. Lucas, Houston, TX (US); Richard P. Cutting, Baytown, TX (US); Benjamin J. Ohran, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 283 days.

(21) Appl. No.: 18/709,439

(22) PCT Filed: Oct. 31, 2022

(86) PCT No.: PCT/US2022/078960
§ 371 (c)(1),
(2) Date: May 10, 2024

(87) PCT Pub. No.: WO2023/091854
PCT Pub. Date: May 25, 2023

(65) Prior Publication Data

US 2025/0025822 A1 Jan. 23, 2025

Related U.S. Application Data

(60) Provisional application No. 63/264,419, filed on Nov. 22, 2021.

(51) Int. Cl.
*C08F 2/34* (2006.01)
*B01J 8/00* (2006.01)
*C08F 2/01* (2006.01)

(52) U.S. Cl.
CPC ................ *C08F 2/01* (2013.01); *B01J 8/001* (2013.01); *C08F 2/34* (2013.01); *B01D 2256/10* (2013.01); *B01D 2257/702* (2013.01)

(58) Field of Classification Search
CPC .................................... C02F 2/34; C02F 2/01
See application file for complete search history.

(56) References Cited

U.S. PATENT DOCUMENTS 4,543,399 A 9/1985 Jenkins et al.
4,621,952 A 11/1986 Aronson
(Continued)

FOREIGN PATENT DOCUMENTS

WO WO-2019099134 A1 * 5/2019 ................ C08F 2/34

*Primary Examiner* — Robert A Hopkins
(74) *Attorney, Agent, or Firm* — C. Tumey Law Group PLLC

(57) ABSTRACT

Processes for venting gas phase olefin polymerization systems are provided. A portion of the reactor overhead can be withdrawn from the reactor to a vent column and contacted with a liquid stripping medium (L) within the vent column to remove at least a portion of the olefin monomer to produce a vent column overhead (G) and a vent column bottoms; recycling the vent column bottoms (rich in the olefin monomer and lean in the carrier gas) to the reactor; determining a L*N to C*G ratio, wherein L is total liquid stripping medium flow to the vent column, N is carrier gas concentration in the reactor overhead, C is the monomer concentration in the reactor overhead, and G is the vent column overhead gas flow. One or more of these flow streams (L, N, C, G) can then be controlled based on the calculated L*N to C*G ratio.

14 Claims, 8 Drawing Sheets

(56) References Cited

U.S. PATENT DOCUMENTS

| | | | |
|---|---|---|---|
| 5,306,792 | A | 4/1994 | Havas et al. |
| 5,521,264 | A | 5/1996 | Hehra et al. |
| 6,255,411 | B1 | 7/2001 | Hartley et al. |
| 8,129,485 | B2 | 3/2012 | Force et al. |
| 11,492,422 | B2 | 11/2022 | Lucas et al. |
| 2011/0046323 | A1 | 2/2011 | Van Der Schrick et al. |
| 2021/0079126 | A1 | 3/2021 | Lucas et al. |

* cited by examiner

REACTOR VENT CONTROL TO AVOID VENT COLUMN BREAKTHROUGH

CROSS-REFERENCE OF RELATED APPLICATIONS

This application is a National Phase Application claiming priority to PCT Application Serial No. PCT/US2022/078960, filed Oct. 31, 2022, which claims the benefit of U.S. Provisional Application 63/264,419, filed Nov. 22, 2021 and entitled "REACTOR VENT CONTROL TO AVOID VENT COLUMN BREAKTHROUGH", the entirety of which is incorporated by reference herein.

FIELD

This application relates to olefin polymerization processes. In particular, this disclosure relates to processes for venting gas phase olefin polymerization systems.

BACKGROUND

Gas phase catalytic polymerization is the predominant technology used to produce polyolefin resins. The catalysts used in the process are contained in solid substrate particles from which the polymer chains grow. Gas phase olefin polymerization technology often employs a fluidized bed, where the particles are fluidized by a gas stream also containing the reactants, such as the olefin monomer or monomers, and a carrier gas. The carrier gas is normally an inert gas such as nitrogen. Processes of this type are described in, for example, EP0475603A1: EP0089691A2; and EP0571826A3.

Pressure control is a vital factor in any gas phase olefin polymerization system and is dominated by the need to remove nitrogen (or other inert carrier gas). Adequate control of the nitrogen is needed to control total reactor pressure or monomer (ethylene) partial pressure. Nitrogen partial pressure is usually controlled to maintain steady reactor conditions by either adding or removing nitrogen. This can be achieved by directly venting nitrogen from the reactor to flare. Doing this without separation facilities to recover the hydrocarbons entrained in the vent gas, however, is not economically attractive and poses potential environmental problems.

More recently in gas phase polymerization processes, the overhead from the fluidized bed containing the carrier gas (i.e. nitrogen) and unreacted monomer(s) is sent to a vent column where the lighter gases are separated in an overhead and the heavier monomer(s) form the bottoms that is recycled to the reactor. Polymer particles produced in the fluidized bed are discharged discontinuously from the reactor and conveyed pneumatically using an inert gas, most often nitrogen, to a product recovery system. An example of an early product recovery system is disclosed in U.S. Pat. No. 4,621,952. More recent configurations employ two pairs of lock hoppers in which a valved connection is provided between the corresponding lock hoppers in each pair as an optional step to reduce gas loss by minimizing the pressure of the discharging pair of lock hoppers. An example of such an improved product recovery system is disclosed in U.S. Pat. No. 6,255,411.

Typically, nitrogen is removed through the vent column rather than a direct cycle gas vent to flare or product purge bin. Vent columns significantly reduce hydrocarbon losses associated with nitrogen venting to the flare. Under certain conditions, hydrocarbon breakthrough can occur in the vent column, meaning hydrocarbon can carry over with the nitrogen. Hydrocarbon breakthrough has been extremely difficult to predict with any decent level of accuracy and therefore difficult to avoid while reducing costs.

There is still a need for systems and processes for controlling gas phase olefin polymerizations having vent columns that can effectively remove nitrogen and minimize hydrocarbon breakthrough, thereby reducing hydrocarbon losses.

SUMMARY

Processes for venting gas phase olefin polymerization systems are provided. In at least one embodiment, the process includes supplying an olefin monomer, a carrier gas, and a particulate catalyst to a reactor under conditions sufficient to polymerize the olefin monomer in the presence of the particulate catalyst to produce a polymer product; withdrawing a reactor overhead from the reactor, the reactor overhead comprising unreacted olefin monomer (C) and carrier gas (N); introducing a portion of the reactor overhead from the reactor to a vent column; contacting the portion of the reactor overhead with a liquid stripping medium (L) within the vent column to remove at least a portion of the olefin monomer to produce a vent column overhead (G) that is rich in the carrier gas and lean in the olefin monomer and a vent column bottoms that is rich in the olefin monomer and lean in the carrier gas; recycling the vent column bottoms that is rich in the olefin monomer and lean in the carrier gas to the reactor; determining a L*N to C*G ratio, wherein L is the total liquid stripping medium flow to the vent column, N is the carrier gas concentration in the reactor overhead to the vent column, C is the monomer concentration in the reactor overhead to the vent column, and G is the vent column overhead gas flow; and controlling one or more of the total liquid stripping medium flow to the vent column (L), the carrier gas concentration in the reactor overhead to the vent column (N), the monomer concentration in the reactor overhead to the vent column (C), and the vent column overhead gas flow (G), based on the calculated L*N to C*G ratio.

The process can further include decreasing the vent column overhead gas flow (G) from the vent column when the calculated L*N to C*G ratio is less than a predetermined value. The process can also further include increasing the vent column overhead gas flow (G) from the vent column when the calculated L*N to C*G ratio is greater than a predetermined value.

DETAILED DESCRIPTION OF THE EMBODIMENTS

It has been surprisingly and unexpectedly discovered that hydrocarbon breakthrough from the vent column for any given gas phase polymerization system and/or polymer grade can be avoided and unnecessary hydrocarbon loss can be prevented or at least substantially minimized when the vent column is controlled to maintain a L*N to C*G ratio above a pre-determined value. In this ratio, the parameter L is the total liquid flow to the vent column, N is the nitrogen concentration (mol %) in the recycle gas stream to the vent column, C is the ethylene concentration (mol %) in the recycle gas stream to the vent column, and G is the vent column overhead gas flow. It has also been surprisingly and unexpectedly discovered that hydrocarbon breakthrough in the vent column can be prevented or at least substantially minimized by controlling any one or more of the following: the total liquid stripping medium flow to the vent column (L), the carrier gas concentration in the reactor overhead to the vent column (N), the monomer concentration in the reactor overhead to the vent column (C), or the vent column overhead gas flow (G), based on the calculated L*N to C*G ratio for any gas phase reactor system and/or polymer grade. As used herein, the term "hydrocarbon breakthrough" means the vent column overhead contains at least 2.5 mol % hydrocarbon.

Figure 1:
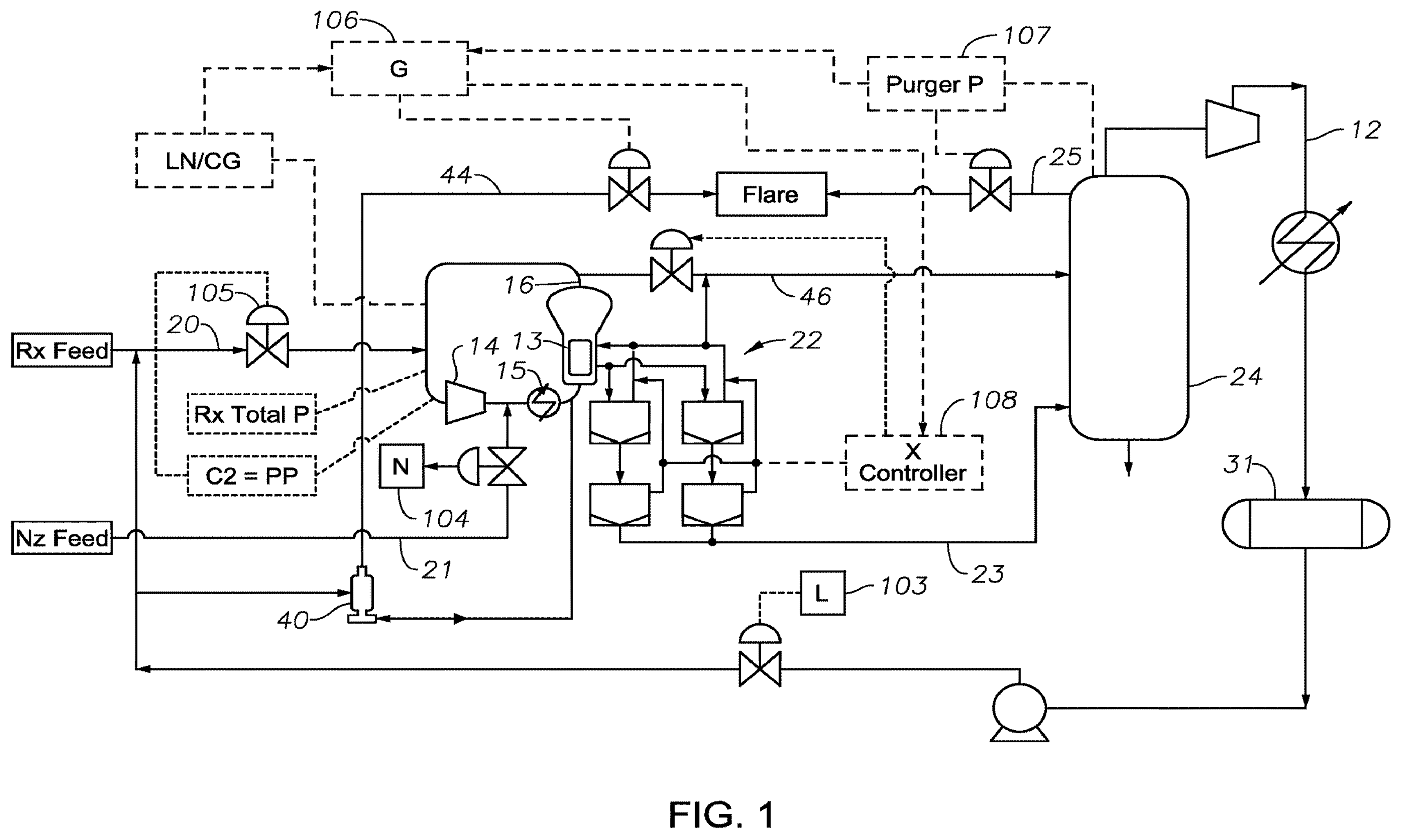
FIG. 1 depicts a simplified flow diagram of a gas phase olefin polymerization system, according to one or more embodiments described.

FIG. 1 depicts a simplified flow diagram of a conventional gas phase olefin polymerization system 100 having a vent column 40, according to one or more embodiments. The polymerization system 100 can further include a fluidized bed reactor 13, a cycle gas compressor 14, a cycle gas cooler 15, and a product discharge system (PDS) 22. The reactor overhead gas (line 16) is rich in ethylene and, if present, one or more other monomers. The overhead gas 16 can be compressed in the cycle gas compressor 14 and then cooled in the cycle gas cooler 15. A portion of the reactor recycle gas or simply "overhead gas" in line 16 can be introduced to the inlet of the reactor 13 and/or a portion of the overhead gas from line 16 can be introduced to the vent column 40.

The polymer product can be removed intermittently from the reactor 13 along with a reactor gas and sent to a product discharge system 22. Product withdrawal can be initiated when the product inventory in the reactor 13 exceeds a desired value. The inventory in the reactor 13 can generally be determined by either the bed level or weight measurements, or from secondary measurements used to infer bed level or bed weight. Upon detection of a high reactor inventory, the product discharge system 22 can be initiated to pass the polymer product and reactor gas from the reactor 13 to the product discharge system 22.

The term "reactor gas" as used herein refers to the gas that leaves the reactor 13 and is a gas mixture that can include ethylene and other optional monomer(s) (e.g., unreacted monomer gas leaving the reactor) and at least a portion of the carrier gas used to fluidize the catalyst and transport the catalyst into the reactor in the first place. The reactor gas may further include hydrogen (used, e.g., as a chain transfer agent in polymerization) as well as reaction and other process byproducts such as water, ammonia, methane, higher alkanes, carbon dioxide, and/or other compounds of oxygen, carbon, and/or hydrogen.

The product discharge system 22 can include first and second pairs of lock hoppers 41(*a*)/41(*b*) and 42(*a*)/42(*b*), respectively, a monomer stripping vessel or product purge bin 24, and a gas vent line 46 in fluid communication with the reactor 13 and the purge bin 24. The monomers stripped from the polymer product can be recovered in the purge bin 24, condensed (line 12), cooled and stored in a condensed liquids drum 31.

The condensed liquids from the condensed liquids drum 31 (line 32) can be used as a stripping medium within the vent column 40. The stripping medium can contact reactor recycle gas within the vent column 40 to produce a vent column overhead 44 that is rich in nitrogen and other inerts and lean in ethylene and, if present, other monomers (i.e. hydrocarbons); and a vent column bottoms 45 that is rich in ethylene and, if present, other monomers, and lean in nitrogen/inerts. The term "rich" when used in phrases such as "X-rich" or "rich in X" means, with respect to an outgoing stream obtained from a device, that the stream includes material X at a concentration higher than in the feed material fed to the same device from which the stream is derived. The term "lean" when used in phrases such as "X-lean" or "lean in X" means, with respect to an outgoing stream obtained from a device, that the stream comprises material X at a concentration lower than in the feed material fed to the same device from which the stream is derived.

Fresh ethylene and, if present, other monomers such as propylene and/or $C_4$ to $C_8$ alpha-olefins, e.g., 1-butene, 1-hexene, and/or 1-octene, from a pipeline or storage can be supplied via line 20 to be mixed with the reactor overhead 16. One or more $C_3$ to $C_6$ alkanes can also be supplied to the reactor 13 to assist in heat removal and/or act as a condensing agent; and hydrogen can be added to control the degree of polymerization. For detailed discussion of using condensing agents (and examples of suitable condensing agents), see WO2020/190511, and in particular paragraphs [0009]-[0012], [0055]-[0060], and [0187]-[0191] for discussion of condensing agents' use, flow through fluidized bed reaction systems, and determination of useful condensing agent compositions. WO2020/190511, and the aforementioned passages in particular, are incorporated herein by reference.

A carrier gas for the polymerization catalyst and for fluidizing the growing polymer particles in the reactor can be mixed with fresh catalyst from storage and supplied to the reactor 13 via line 20. The carrier gas is preferably nitrogen, though it can be any gas that would not react with the catalyst nor alter the polymerization reaction (i.e. inert). Carrier gases for gas phase fluidized bed polymerization reactors are well known in the art, and their identity is not the focus of the present disclosure.

The reactor 13 can be operated under sufficient conditions to maintain the monomer(s) in the gas phase and polymerize the monomer(s) to produce an ethylene homopolymer or copolymer. Typical polymerization conditions include a temperature of 70° C. to 110° C. and a pressure of 1,500 kPa-absolute to 3,000 kPa-absolute, such as 1,700 kPa-absolute to 2,600 kPa-absolute.

Figure 2:
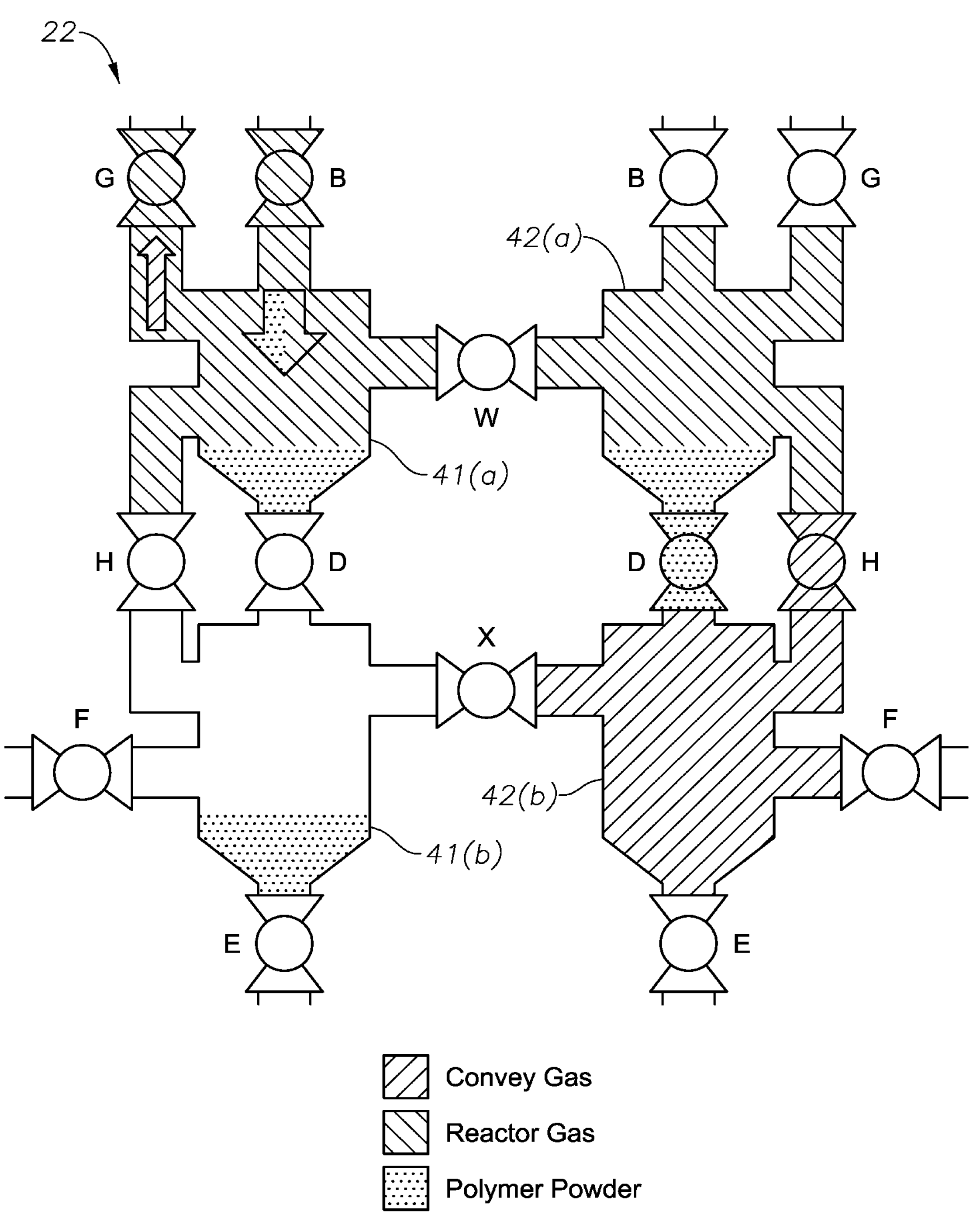
FIG. 2 depicts a schematic representation of a product delivery system for use in the system of FIG. 1, according to one or more embodiments described.

Considering the product discharge system 22 in more detail. FIG. 2 depicts a schematic representation of an illustrative product discharge system 22, according to one or more embodiments. The product discharge system 22 can include first and second pairs of lock hoppers 41(*a*)/41(*b*) and 42(*a*)/42(*b*). The first pair of lock hoppers 41(*a*) and 41(*b*) and the second pair of lock hoppers 42(*a*) and 42(*b*) can be connected in parallel between the reactor 13 and line 23 which feeds the purge bin 24. In addition, a first cross-tie valve (W) can be provided between the upstream lock hoppers 41(*a*) and 42(*a*) and a second cross-tie valve (X) can be provided between the downstream lock hoppers 41(*b*), 42(*b*). The first cross-tie (W) can also be referred to as the "W cross-tie" and the second cross-tie (X) can also be referred to as the "X cross-tie".

The upstream lock hoppers 41(*a*), 42(*a*) can be connected by valves B and G to the reactor 13. The upstream lock hoppers 41(*a*), 42(*a*) can also be connected by valves D and H to the downstream lock hopper 41(*b*), 42(*b*). The downstream lock hoppers 41(*b*), 42(*b*) can each be connected by a valve E to line 23 and the product recovery loop 12. Each downstream lock hopper 41(*b*), 42(*b*) can also be connected by a valve F to a source of conveying gas to facilitate transfer of polymer product from the downstream lock hopper 41(*b*), 42(*b*) into line 23.

To initiate a product discharge cycle, one of the valves B can be opened that connects the reactor 13 with the upstream lock hopper 41(*a*), with the other valves connected to the hopper 41(*a*) being closed to isolate it from the remainder of the product discharge system 22. When the valve B is opened, polymer product and reactor gas flow into the lock hopper 41(*a*) (as illustrated by the arrow in FIG. 2) and, as the lock hopper 41(*a*) approaches a desired fill level, the associated valve G can be opened to allow the pressure in the lock hopper 41(*a*) to equilibrate with that of the reactor 13 and thereby facilitate filling of lock hopper 41(*a*). When lock hopper 41(*a*) is filled to a desired level, valves B and G can be closed and the valve D connecting lock hoppers 41(*a*) and 41(*b*) can be opened to allow the contents of lock hopper 41(*a*) to be transferred to lock hopper 41(*b*). During this operation, the hopper 41(*b*) can be isolated from the remainder of the product discharge system 22 (e.g., with valves X. E. F, and H remaining closed), at least until the hopper 41(*b*) approaches being filled to a desired level, at which time valve H can also be opened to allow the pressures in lock hoppers 41(*a*) and 41(*b*) to equilibrate. When lock hopper 41(*b*) is filled to the desired level, valves D and H can be closed, and valves E and F can be opened to allow the conveying gas to transport the polymer product from the lock hopper 41(*b*) to the product purge bin 24. The whole operation can be similarly carried out for lock hoppers 42(*a*) and 42(*b*).

The removal of the polymer product from the reactor 13 through the product discharge system 22 can be accomplished in sequential removal cycles, where each removal cycle includes the steps of: (1) transferring polymer product and reactor gas from the reactor 13 to (1a) the upstream lock hopper 41(*a*) of the first pair of lock hoppers 41(*a*)/41(*b*) and equilibrating the pressure therebetween or (1b) the upstream lock hopper 42(*a*) of the second pair of lock hoppers 42(*a*)/42(*b*) and equilibrating the pressure therebetween; (2) while performing step (1), transferring polymer product and reactor gas from (2a) the upstream lock hopper 42(*a*) to the downstream lock hopper 42(*b*) of the second pair of lock hoppers 42(*a*)/42(*b*) and equilibrating the pressure therebetween or (2b) the upstream lock hopper 41(*a*) to the downstream lock hopper 41(*b*) of the first pair of lock hoppers 41(*a*)/41(*b*) and equilibrating the pressure therebetween; (3) while performing steps (1) and (2), transferring polymer product using a conveying gas from (3a) the downstream lock hopper 41(*b*) of the first pair of lock hoppers 41(*a*)/41(*b*) to the product purge bin 24 or (3b) the downstream lock hopper 42(*b*) of the second pair of lock hoppers 42(*a*)/42(*b*) to the product purge bin 24: (4) after performing steps (1), (2), and (3), passing reactor gas from (4a) the upstream lock hopper 41(*a*) of the first pair of lock hoppers 41(*a*)/41(*b*) to the upstream lock hopper 42(*a*) of the second pair of lock hoppers 42(*a*)/42(*b*) via the first or W cross-tie 43(*a*) to equilibrate the pressure therebetween or (4b) the upstream lock hopper 42(*b*) of the second pair of lock hoppers 42(*a*)/42(*b*) to the upstream lock hopper 41(*a*) of the first pair of lock hoppers 41(*a*)/41(*b*) via the first or W cross-tie 43(*a*) to equilibrate the pressure therebetween; and further some or all of the removal cycles can further include the step of: (5) after performing steps (1), (2), and (3), passing reactor gas from (5a) the downstream lock hopper 41(*b*) of the first pair of lock hoppers 41(*a*)/41(*b*) to the downstream lock hopper 42(*b*) of the second pair of lock hoppers 42(*a*)/42(*b*) via the second or X cross-tie 43(*b*) to equilibrate the pressure therebetween or (5b) the downstream lock hopper 41(*b*) of the second pair of lock hoppers 42(*a*)/42(*b*) to the downstream lock hopper 41(*a*) of the first pair of lock hoppers 41(*a*)/41(*b*) via the second or X cross-tie 43(*b*) to equilibrate the pressure therebetween. Steps (1a), (2a), (3a), (4a), and (5a) or steps (1b), (2b), (3b), (4b), and (5b), respectively, can be carried out in sequential order and in alternating removal cycles with respect to one another. In some embodiments, during steps (1), (2), (3), (4), and (5) each lock hopper can be isolated by closed valves from any of the reactor 13, the other lock hoppers, and the product discharge system 22 not necessary for the performance of the respective step.

As mentioned above, it has been surprisingly and unexpectedly discovered that vent column breakthrough for any given reactor system and/or polymer grade can be avoided, and unnecessary hydrocarbon loss can be prevented when the vent column 40 is controlled to maintain a L*N to C*G ratio above a pre-determined value. In some embodiments, the secondary vent controller 108 within the product discharge system 22 can also be used to reduce the vent column overhead flow to avoid column breakthrough. For example, the X-cross tie controller 108 can be used to reduce the frequency that the X-cross tie is turned on, thereby reducing the amount of nitrogen entering the reactor via the product discharge system 22. Since less nitrogen enters the reactor 13, a lower vent column overhead flow can be used to achieve the required inert venting. The X-cross tie utilization frequency can be reduced until the required vent column overhead flow is below the maximum as determined by the LN/CG value.

To maintain the L*N to C*G ratio above a pre-determined value, the total liquid stripping medium flow (L) to the vent column 40 can be controlled to ensure the L*N to C*G ratio is kept above the pre-determined value for a given reactor gas composition. The vent column overhead gas flow ("G") can also be controlled to ensure the L*N to C*G ratio is kept above the pre-determined value for a given reactor gas composition. The ethylene concentration (C) within the vent column overhead line 44 can also be controlled to ensure the L*N to C*G ratio is kept above the pre-determined value for a given reactor gas composition. The nitrogen or inert concentration (N) (mol %) in the recycle gas stream 16 to the reactor 13 can also be controlled to ensure the L*N to C*G ratio is kept above the pre-determined value for a given reactor. In certain embodiments, any two or more of the L, N, C, G can be controlled to ensure the L*N to C*G ratio is kept above the pre-determined value for a given reactor. In certain embodiments, any three or more of the L, N, C, G can be controlled to ensure the L*N to C*G ratio is kept above the pre-determined value for a given reactor. In certain embodiments, all four of the L, N, C, G can be controlled to ensure the L*N to C*G ratio is kept above the pre-determined value for a given reactor.

A preferred L*N to C*G ratio is 3.5 or more. The L*N to C*G ratio can also be at least 4, 4.5, 5, 5.5, 6, 6.5, 7 or 8. The L*N to C*G ratio can range from a low of about 3.5, 5, 7, or 10 to a high of about 15, 30, 40, or 50.

These flows can be controlled using commonly available techniques. For example, the flow can be controlled manually using a valve or other type of flow restrictor. The flow can also be automatically controlled using an automated control valve with a programmable control logic. For example, a control valve 103 on the recovered liquids line 32 can be used to adjust the total liquid flow (L) within line 32 to the vent column 40, as depicted in FIG. 1. A control valve 104 on the fresh nitrogen feed 21 can be used to adjust the total nitrogen or inert concentration (N) (mol %) in the recycle gas stream 16 to the reactor 13. A control valve 105 on the fresh monomer feed stream 20 can be used to control the ethylene concentration (C) (mol %) within the vent column overhead line 44. A vent column overhead controller 106 can be used to control a valve on the vent column overhead line 44 to control the vent column overhead gas flow ("G").

In certain embodiments, the ethylene concentration (C) within the vent column overhead line 44 can be controlled by manipulating the flow of the reactor gas stream 16 to the vent column 40, the flow of gas through the cross ties W, X in the product discharge system 22, and/or the vent 25 from the purge bin 24. The total reactor pressure (P) can be controlled by the ethylene feed to the reactor 13. To maintain a constant reactor pressure (P), whenever the reactor gas is vented from the reactor 13, this vented gas can be replaced by fresh ethylene feed from line 20. For example, if the vent column overhead 44 is increased, that gas volume can be replaced by fresh ethylene, which will increase the ethylene concentration C. Therefore, increasing the vent column overhead gas rate G will increase C. The ethylene concentration C can also be increased by venting directly to flare through the purge bin line 25 and replacing that vented gas with fresh ethylene feed. The ethylene concentration C can also be increased by turning off the cross valves (W, X), so that more gas exits the reactor loop through the discharge system and can be replaced with fresh ethylene, which will increase the ethylene concentration C.

The fresh nitrogen feed 21 and control valve 104 can also be used to adjust the nitrogen concentration N. However, the nitrogen concentration (N) can be increased by decreasing the vent column overhead 44. Conversely, the nitrogen concentration (N) can be decreased by increasing the vent column overhead 44 and replacing the vented gas with fresh ethylene monomer.

Alternatively, in the event the L*N to C*G ratio indicates there is available room to increase the vent column overhead gas flow 44, the vent column overhead flow ("G") can be increased, and venting via less efficient streams (e.g. product discharge system, direct from the reactor to the purge bin, vent column overhead after break-through, or straight to flare) can be reduced.

Controlling the reactor vent using the L*N to C*G ratio, according to one or more embodiments provided herein, can prevent or at least substantially minimize vent column breakthrough, which can replace the need to change the vent column overhead gas flow set point or maximum. By doing so, raw material losses can be minimized, and profitability can be maximized.

Further, according to some embodiments, the control scheme may include a high-pressure override based upon pressure in the purge bin (Purger P), as shown with Purger P override controller 107 in FIG. 1. This may override the G setpoint (e.g., of controller 106) so as to result in opening the vent 25 from the purge bin.

Finally, respecting control strategies, it is noted that FIG. 1 includes an illustrative example of control connectivity to portions of the reactor system (e.g., with inputs/measurements of LN/CG shown informing the vent column overhead controller 106, e.g., based upon a desired set-point of G: with said controller 106 also taking input from the Purger P override controller 107 to account for potential override based on purge bin pressure (in which case the override controller 107 acts directly on the valve for vent 25 from the purge bin 24). The controller 106 can act on the vent in overhead gas flow 44, and/or on the X cross-tie controller 108, as shown in FIG. 1. Similarly, reactor total pressure ("Rx Total P" in FIG. 1) and ethylene partial pressure ("C2=PP" in FIG. 1) are shown as variables measured from the system and used in controlling the control valve 105 on fresh monomer (ethylene) feed line 20.

EXAMPLES

The foregoing discussion can be further described with reference to the following non-limiting examples. In the examples that follow, the vent column data collected from the polymerization of various polyethylene grades were analyzed. The polymer grades were ethylene-hexene copolymers and varied in $MI_{2.16}$ from about 0.2 g/10 min to about 19 g/10 min and had a density range of 0.906 g/cm$^3$ to about 0.940 g/cm$^3$.

The polyethylene grades were made using a commercial gas phase polymerization system. The reaction and polymer properties are report in Table 1 below. $C_1$ was an ECAT or HP1000 metallocene catalyst that is commercially available from Exxon Mobil Chemical Company. C2 was a SCAT or EZ2000 metallocene catalyst that is also commercially available from Exxon Mobil Chemical Company. Reactor A was a 17 ft diameter gas phase polyethylene reactor producing hexene copolymers using isopentane and isobutane as condensing agents. Reactor B was a 14.5 ft diameter gas phase polyethylene reactor producing hexene copolymers using isopentane as a condensing agent.

TABLE 1

Reaction and polymer properties

| Polymer | $MI_{2.16}$ (g/10 min) | Density (g/cm$^3$) | Catalyst | Rx. | Rx. Press |
|---|---|---|---|---|---|
| PE1 | 1.0 | 0.918 | C1 | A | 320 |
| PE2 | 1.5 | 0.918 | C1 | A | 320 |
| PE3 | 3.5 | 0.918 | C1 | A | 320 |
| PE4 | 4.5 | 0.918 | C1 | A | 320 |
| PE5 | 0.5 | 0.920 | C2 | A | 320 |
| PE6 | 1.0 | 0.920 | C2 | A | 320 |
| PE7 | 0.3 | 0.927 | C2 | A | 320 |
| PE8 | 0.5 | 0.927 | C2 | A | 320 |
| PE9 | 0.5 | 0.935 | C2 | A | 320 |
| PE10 | 1.0 | 0.918 | C1 | B | 290 |
| PE11 | 1.5 | 0.918 | C1 | B | 290 |
| PE12 | 3.5 | 0.918 | C1 | B | 290 |
| PE13 | 4.5 | 0.918 | C1 | B | 290 |
| PE14 | 0.5 | 0.920 | C2 | B | 290 |
| PE15 | 1.0 | 0.920 | C2 | B | 290 |

TABLE 1-continued

| Reaction and polymer properties | | | | | |
|---|---|---|---|---|---|
| Polymer | $MI_{2.16}$ (g/10 min) | Density (g/cm$^3$) | Catalyst | Rx. | Rx. Press |
| PE16 | 0.3 | 0.927 | C2 | B | 290 |
| PE17 | 0.5 | 0.927 | C2 | B | 290 |
| PE18 | 0.5 | 0.935 | C2 | B | 290 |

Figure 3:
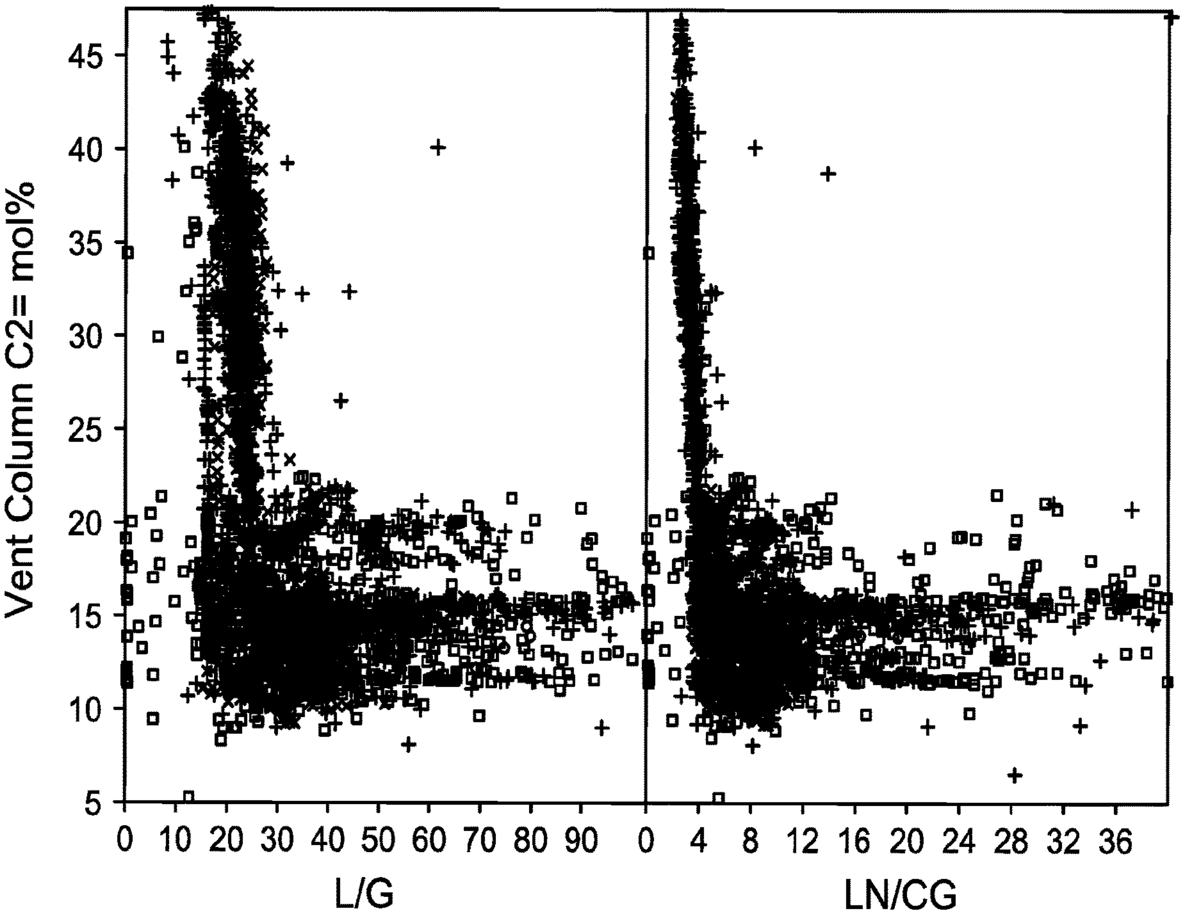
FIG. 3 graphically depicts two different ratios to predict vent column breakthrough on four (4) different polyethylene grades produced in a gas phase polymerization system, according to one or more embodiments provided herein.
Figure 4:
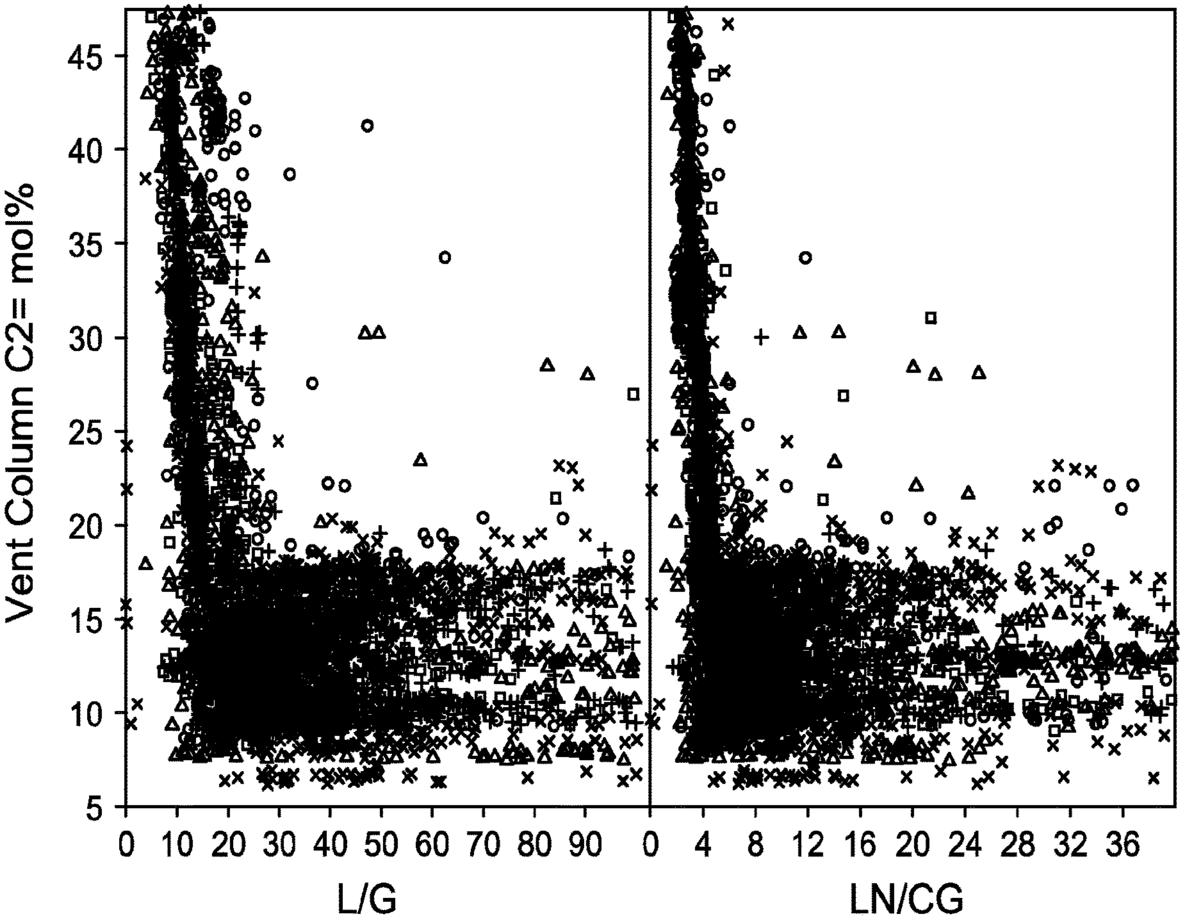
FIG. 4 graphically depicts two different ratios to predict vent column breakthrough on five (5) more polyethylene grades produced in a gas phase polymerization system, according to one or more embodiments provided herein.

FIG. 3 graphically depicts two different ratios to predict vent column breakthrough on four (4) different polyethylene grades (PE1-PE4) produced in a gas phase polymerization system as depicted in FIG. 1, using Catalyst 1 ("C1") in Reactor A. FIG. 4 graphically depicts two different ratios to predict vent column breakthrough on five (5) different polyethylene grades (PE5-PE9) produced in a gas phase polymerization system as depicted in FIG. 1, using Catalyst 2 ("C2") in Reactor A. Referring to FIGS. 3 and 4, L is the vent column liquid flow, N is the nitrogen composition in the cycle gas, G is the vent column overhead gas flow, and C is the ethylene composition in the cycle gas. The chart on the left depicts the ethylene concentration in the overhead vent versus L/G. The chart on the right depicts the ethylene concentration in the overhead vent versus LN/CG. Breakthrough of the vent column happened at a L*N to C*G ratio of about 5, and the vent column overhead stream ethylene (C2═) content was about 20 mol % and the ethylene content increased significantly as the ratio decreased.

Figure 5:
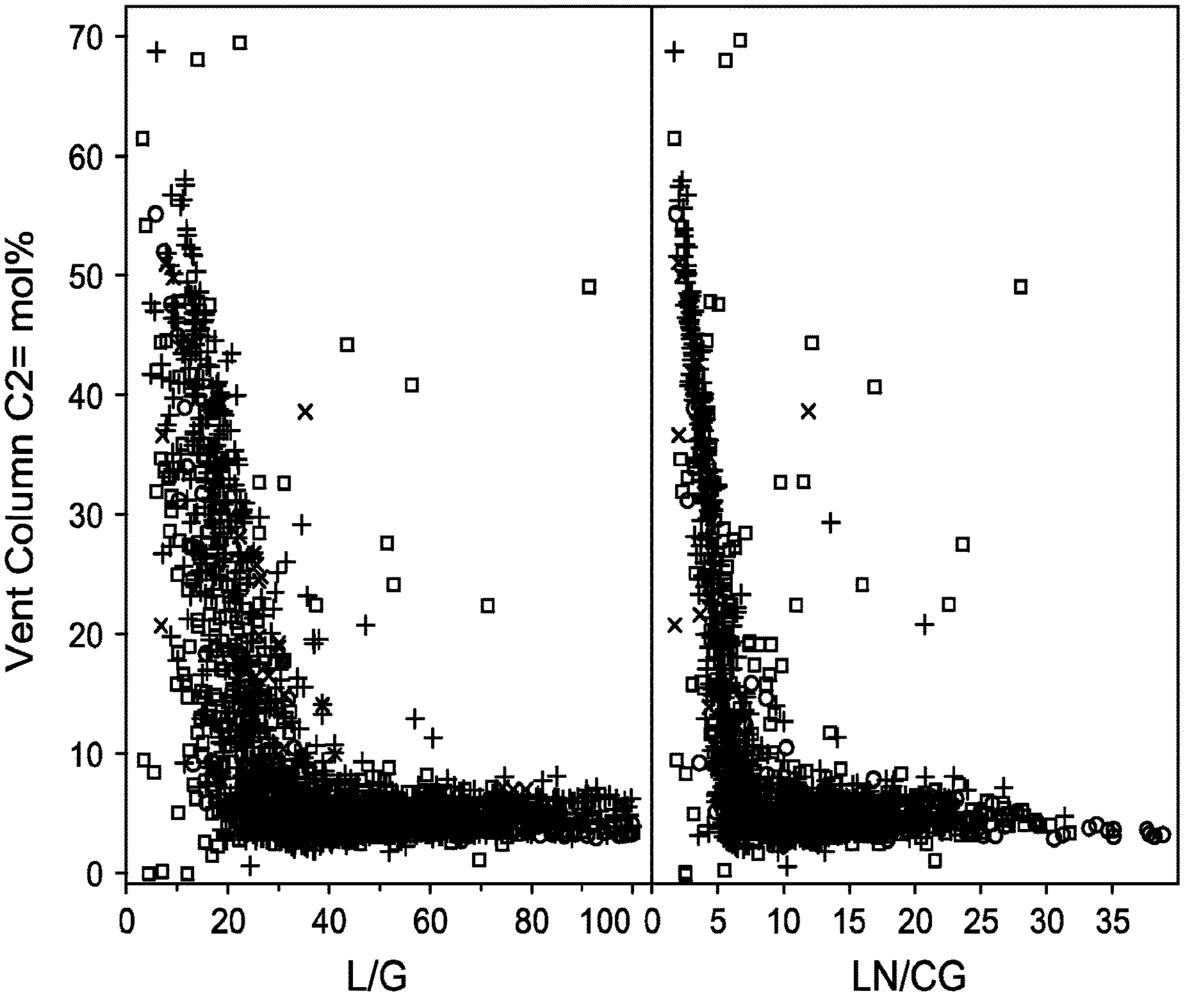
FIG. 5 graphically depicts two different ratios to predict vent column breakthrough on four (4) more polyethylene grades produced in a gas phase polymerization system, according to one or more embodiments provided herein.
Figure 6:
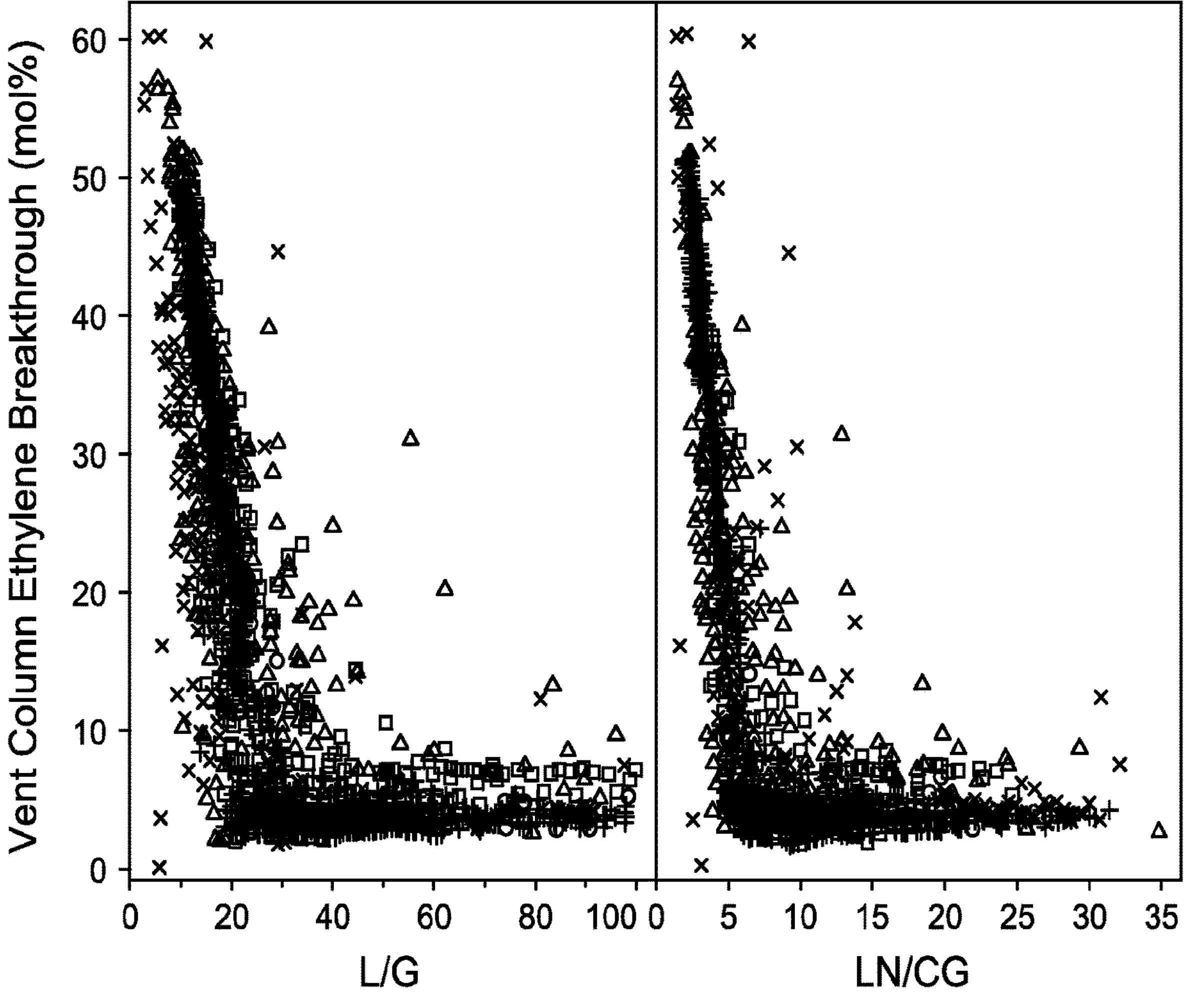
FIG. 6 graphically depicts two different ratios to predict vent column breakthrough on five (5) more polyethylene grades produced in a gas phase polymerization system, according to one or more embodiments provided herein.

FIG. 5 graphically depicts two different ratios to predict vent column breakthrough on four (4) different polyethylene grades (PE10-PE13) produced in a gas phase polymerization system as depicted in FIG. 1, using Catalyst 1 ("C1") in Reactor B. FIG. 6 graphically depicts two different ratios to predict vent column breakthrough on five (5) different polyethylene grades (PE14-PE18) produced in a gas phase polymerization system as depicted in FIG. 1, using Catalyst 2 ("C2") in Reactor B. Once again, L is the vent column liquid flow, N is the nitrogen composition in the cycle gas, G is the vent column overhead gas flow, and C is the ethylene composition in the cycle gas. Breakthrough of the vent column happened at a L*N to C*G ratio of about 5, and the vent column overhead stream ethylene (C2═) content was about 10 mol % and the ethylene content increased significantly as the ratio decreased.

In FIGS. 3-6, ethylene breakthrough varied significantly using the L/G ratio. The L*N to C*G ratio (shown on the right) significantly reduced the scattering of the ethylene concentration data and provided the best ability to predict vent column breakthrough across the grade slates. Based on the data, as long as the L*N to C*G ratio was at least 5, the overhead vent column stream did not have significant hydrocarbon breakthrough.

Figure 7:
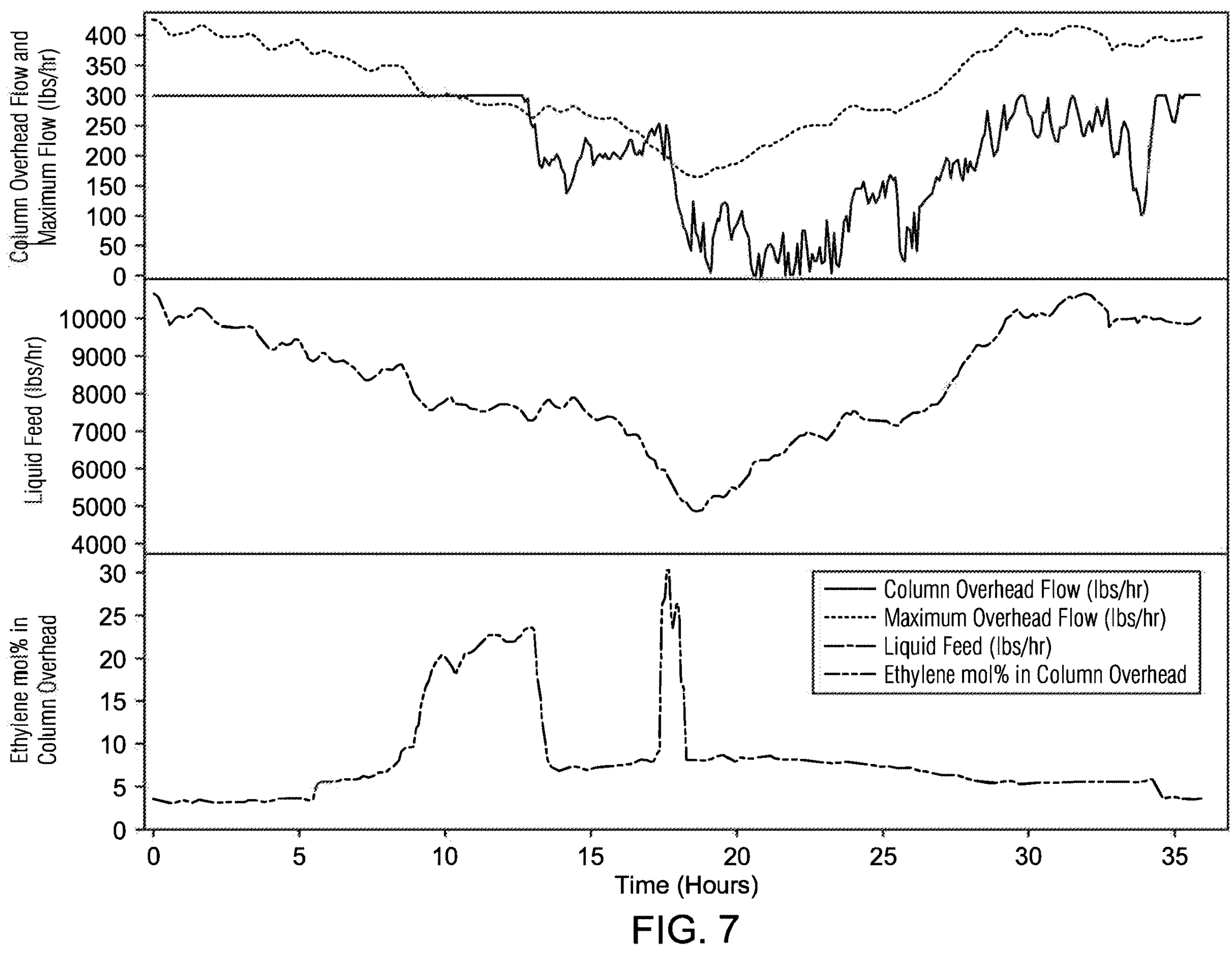
FIG. 7 shows a series of data collected from a gas phase polymerization run for making polyethylene in a commercial scale gas phase reactor.

FIG. 7 shows a series of data collected from a gas phase polymerization run for making various ethylene copolymers in a gas phase polymerization system as depicted in FIG. 1 using Catalyst 1 ("C1") in Reactor B. In the event shown, a maximum overhead flow rate was calculated using a constant L*N to C*G ratio of 5. Prior to the event, the vent column was operating at an overhead flow clamp of 300 lbs/hr with <5 mol % ethylene in the overhead gas. The reactor rates were steadily decreased, resulting in a concomitant decrease in recovered liquid feed to the column ("L"). This caused the calculated maximum overhead flow to the column to also decrease, eventually crossing below the 300 lbs/hr flow rate and column breakthrough in excess of 20 mol % ethylene. Column flow was then decreased to limit breakthrough, resulting in satisfactory column performance. Again, as liquid feed continued to fall, the maximum calculated overhead flow fell below the overhead column flow, resulting in a second breakthrough event, this time in excess of 30 mol % ethylene (bottom line). A controller dedicated to maintaining the L*N to C*G ratio at about 5 would have automatically responded to the falling liquid feed rate (line 32) and adjusted the overhead flow (line 44) to prevent column breakthrough, where existing control methods are unable to predict breakthrough as a function of liquid feed rates.

Figure 8:
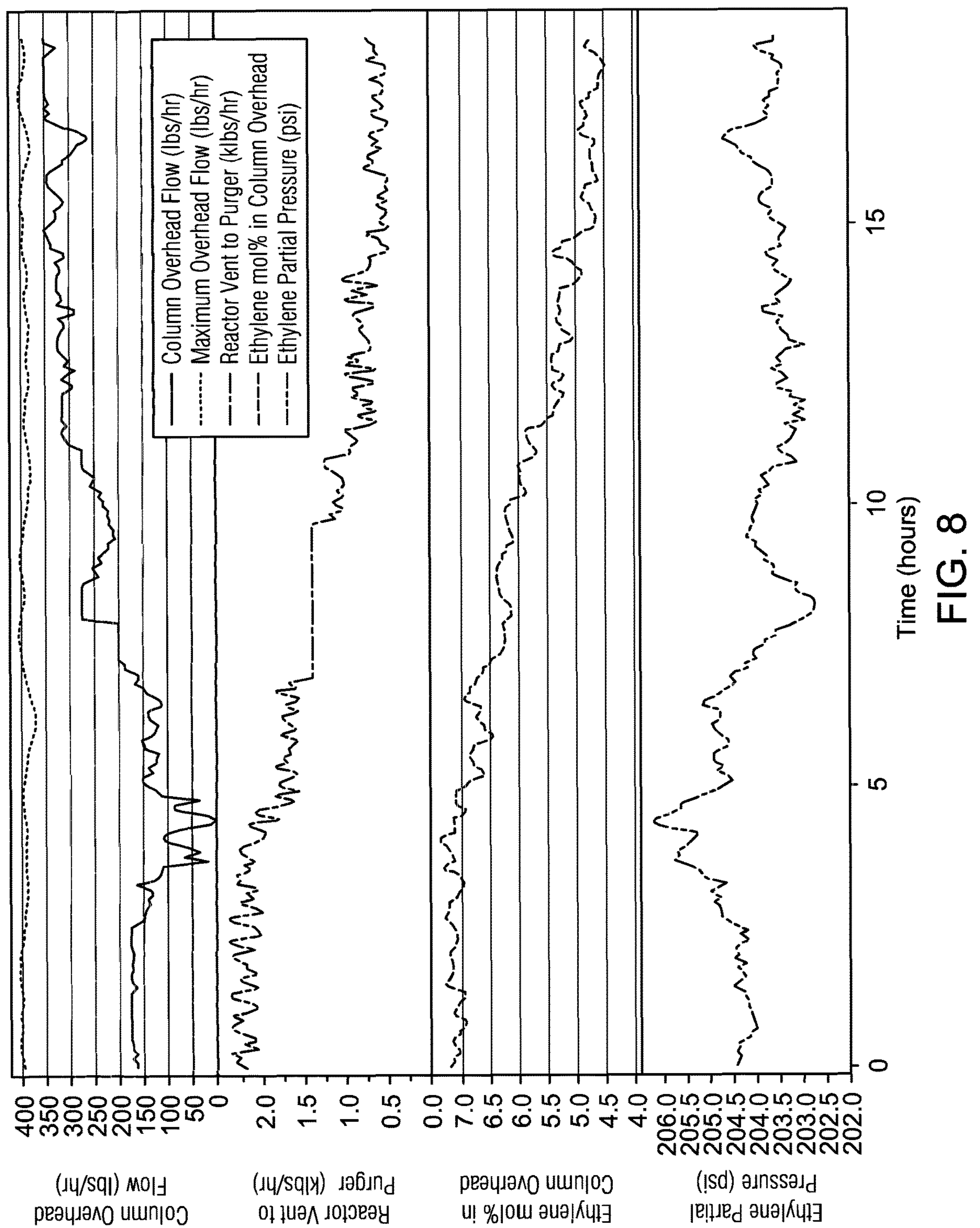
FIG. 8 shows a series of data collected from another gas phase polymerization run for making polyethylene in a commercial scale gas phase reactor.

FIG. 8 shows a series of data collected from another gas phase polymerization run for making various ethylene copolymers in a gas phase polymerization system as depicted in FIG. 1 using Catalyst 1 ("C1") in Reactor B. The purpose of this test was to predict vent column overhead capacity and increase the vent column overhead flow while decreasing the reactor vent to the purge bin, all without upsetting the reactor nitrogen balance and ethylene partial pressure control. In FIG. 8, the solid line in the first lane is the actual column overhead flow "G", while the dotted line is the maximum overhead flow calculated using an L*N to C*G ratio of 5. A prediction was made that the vent column flow rate could be increased to at least 400 lbs/hr with a reactor vent decrease to 500 lbs/hr. Over the next 20 hours, operations was able to increase the vent column overhead flow to 350 lbs/hr and decrease the reactor vent to the purge bin to approximately 600 lbs/hr without any significant change in reactor ethylene partial pressure, or ethylene breakthrough on the column. The test was unable to move any further due to a reactor shutdown, but the calculations continued to indicate there was still excess capacity on the column to reduce the reactor to purge vent to <500 lbs/hr. Transferring the onus of ethylene partial pressure control from the vent to the purge bin to the vent column represents a significant improvement in hydrocarbon loss.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for venting a gas phase polymerization reactor, comprising:

supplying olefin monomers, a carrier gas, and a particulate catalyst to a reactor under conditions sufficient to polymerize the olefin monomers in the presence of the particulate catalyst to produce a polymer product;

withdrawing a reactor overhead from the reactor, the reactor overhead comprising unreacted olefin monomers (C) and carrier gas (N);

introducing a vent-bound portion of the reactor overhead from the reactor to a vent column;

contacting the vent-bound portion of the reactor overhead with a liquid stripping medium (L) within the vent column to remove at least a portion of the unreacted olefin monomers to produce (i) a vent column overhead (G) that is rich in the carrier gas and lean in the unreacted olefin monomers and (ii) a vent column bottoms that is rich in the unreacted olefin monomers and lean in the carrier gas;

recycling the vent column bottoms that is rich in the olefin monomers and lean in the carrier gas to the reactor;

determining a L*N to C*G ratio, wherein L is the total liquid stripping medium flow to the vent column (kg/hr) N is the carrier gas concentration in the reactor overhead to the vent column (mol %), C is the monomer concentration in the reactor overhead to the vent column (mol %), and G is the vent column overhead gas flow (kg/hr); and controlling one or more of: the total liquid stripping medium flow to the vent column (L); the carrier gas concentration in the reactor overhead to the vent column (N); the monomer concentration in the reactor overhead to the vent column (C); and the vent column overhead gas flow (G), based on the calculated L*N to C*G ratio.

2. The process of claim 1, further comprising decreasing the vent column overhead gas flow (G) from the vent column when the calculated L*N to C*G ratio is less than a predetermined value.

3. The process of claim 1, further comprising increasing the vent column overhead gas flow (G) from the vent column when the calculated L*N to C*G ratio is greater than a predetermined value.

4. The process of claim 1, further comprising increasing the total liquid stripping medium flow (L) to the vent column when the calculated L*N to C*G ratio is less than a predetermined value.

5. The process of claim 1, further comprising decreasing the total liquid stripping medium flow (L) to the vent column when the calculated L*N to C*G ratio is greater than a predetermined value.

6. The process of claim 1, wherein the carrier gas comprises molecular nitrogen.

7. The process of claim 1, wherein the olefin monomers comprise ethylene.

8. The process of claim 7, wherein the olefin monomers further comprise at least one $C_3$ to $C_8$ alpha-olefin.

9. The process of claim 1, wherein the polymerization of the olefin monomers is conducted under conditions such that the olefin monomers are in the gas phase.

10. The process of claim 1, wherein the polymerization of the olefin monomers is conducted under conditions including a temperature of 70° C. to 110° C. and a pressure of 1,500 kPa-absolute to 3,000 kPa-absolute.

11. The process of claim 1, wherein the stripping medium contacted with the first portion of the reactor overhead within the vent column comprises condensed hydrocarbons separated from the polymer product within the product purge bin.

12. The process of claim 1, wherein the L*N to C*G ratio is equal to or greater than 5.

13. The process of claim 1, wherein the L*N to C*G ratio is equal to or greater than 10.

14. The process of claim 1, wherein the L*N to C*G ratio is 5 to 10.

* * * * *